United States Patent
Coquelet et al.

(10) Patent No.: US 10,600,042 B2
(45) Date of Patent: Mar. 24, 2020

(54) ELECTRONIC PAYMENT TERMINAL INTEGRATING A SHOCK-RESISTANT CONTACTLESS PAYMENT MODULE, CORRESPONDING LIGHT GUIDE

(71) Applicant: Ingenico Group, Paris (FR)

(72) Inventors: Didier Coquelet, Puiseux le Hauberger (FR); Franck Robert, Paris (FR); Ferhaj Chowdhary, Jouy le Moutier (FR)

(73) Assignee: INGENICO GROUP, Paris (FR)

( * ) Notice: Subject to any disclaimer, the term of this patent is extended or adjusted under 35 U.S.C. 154(b) by 346 days.

(21) Appl. No.: 15/357,487

(22) Filed: Nov. 21, 2016

(65) Prior Publication Data

US 2017/0148007 A1 May 25, 2017

(30) Foreign Application Priority Data

Nov. 19, 2015 (FR) ..................... 15 61159

(51) Int. Cl.
*G06Q 20/20* (2012.01)
*G07F 7/08* (2006.01)

(52) U.S. Cl.
CPC ......... *G06Q 20/204* (2013.01); *G07F 7/0893* (2013.01)

(58) Field of Classification Search
CPC ............................ G06Q 20/204; G07F 7/0893
See application file for complete search history.

(56) References Cited

U.S. PATENT DOCUMENTS

| 9,399,844 | B1* | 7/2016 | King | G02B 6/0011 |
| 2014/0276014 | A1* | 9/2014 | Khanicheh | A61B 5/6801 |
| | | | | 600/425 |
| 2018/0144884 | A1* | 5/2018 | Andre | G06F 3/0202 |

FOREIGN PATENT DOCUMENTS

KR 200471919 Y1 * 3/2014
KR 200471919 Y1 3/2014

OTHER PUBLICATIONS

French Search Report and Written Opinion dated Apr. 12, 2016 for corresponding French Application No. 1561159, filed Nov. 19, 2015.
English translation of the French Written Opinion dated Apr. 12, 2016 for corresponding French Application No. 1561159, filed Nov. 19, 2015.

* cited by examiner

*Primary Examiner* — Sonji N Johnson
(74) *Attorney, Agent, or Firm* — David D. Brush; Westman Champlin & Koehler, P.A.

(57) ABSTRACT

An electronic payment terminal includes a light guide to guide the light from at least one light source internal to the electronic payment terminal to the exterior of the electronic payment terminal. The light guide is integrated with a contactless payment module integrated with the electronic payment terminal and additionally includes at least one shock-absorbing pad extending beyond the external surface of the electronic payment terminal.

11 Claims, 3 Drawing Sheets

ELECTRONIC PAYMENT TERMINAL INTEGRATING A SHOCK-RESISTANT CONTACTLESS PAYMENT MODULE, CORRESPONDING LIGHT GUIDE

1 CROSS-REFERENCE TO RELATED APPLICATIONS

This Application claims priority to and the benefit of French Application No. 1561159, filed Nov. 19, 2015, the content of which is incorporated herein by reference in its entirety.

2 FIELD OF THE DISCLOSURE

The present disclosure relates to the field of electronic payment terminals, and more particularly to electronic payment terminals offering the possibility of contactless payment, for example through a specific integrated module.

3 PRIOR-ART SOLUTIONS

The appearance of the contactless payment standard in business transactions has led to new constraints for electronic payment terminals offering this possibility. In particular, new problems have appeared concerning the integration of the antenna used for the communications between the terminal and the user's payment card.

In one particularly widespread configuration, this antenna is disposed on the rim of the screen of the terminal. Thus, to carry out a contactless transaction with such an apparatus, the user must present his card on the screen of the terminal in order to set up communications enabling the transaction.

While such an implementation is interesting in terms of the compactness of the terminal, it leads to problems of electromagnetic compatibility which can impair communications between the electronic payment terminal and the user's payment card. Such interference can even impede the attainment of performance levels required by the latest standards in force in the field (i.e. the ISO/IEC 14443, ISO18092:2004 and ISO15693 standards).

In response to this problem, the inventors of the present patent application have designed a novel type of electronic payment terminal having a contactless payment module that is externally mounted on one side of the terminal. Thus, the antenna dedicated to communications with the user's payment card is more efficiently isolated from electromagnetic pollution related to the operation of the rest of the terminal. This makes it possible to attain high performance compliant with the requirements of the latest standards in the field.

However, the inventors have observed that this external mounting of the contactless payment module can make the electronic payment terminal fragile, especially when it is dropped. Indeed, the part that is externally mounted is often exposed in such a fall, which can happen for example when the merchant presents the electronic payment terminal to the payment card user. The companies that manufacture these electronic payment terminals therefore commonly seek to make products capable of withstanding falls of more than 80 cm or even 1.2 m in certain cases.

To improve the resistance of such a product, one solution could be to use a casing, for example of the type found in different electronic apparatuses. However, such a solution raises problems of esthetic appearance and cost as well as problems of reliability. Indeed, such a casing can get detached during a fall, and the reliability of the proposed solution cannot be adequate for such a professional application.

There is therefore a need for a reliable, low-cost solution for making an electronic payment terminal with an externally mounted, shock-proof contactless payment module.

4 SUMMARY

An exemplary embodiment of the present disclosure proposes a novel solution that does not have all these drawbacks of the prior art, in the form of an electronic payment terminal comprising a light guide to guide the light from at least one light source internal to said electronic payment terminal to the exterior of said electronic payment terminal, said electronic payment terminal being characterized in that said light guide is integrated with a contactless payment module integrated with said electronic payment terminal and further comprises at least one shock-absorbing pad extending beyond the external surface of said electronic payment terminal.

Thus, an aspect of the present disclosure proposes a novel and inventive solution to increase the resistance to shocks of an electronic payment terminal enabling contactless payment while maintaining an optimum cost for the solution.

Indeed, an aspect of the present disclosure provides that the light guide initially dedicated to the display of light points dictated by the contactless payment standards mentioned here above in order to report the progress of the transaction, are also used to absorb shocks, for example when the terminal is dropped.

Thus, according to an aspect of the present disclosure, the shock absorption pads are dedicated more specifically to the protection of the contactless payment module of an electronic payment terminal since this module is more fragile than the rest of the device when it is externally mounted.

To this end, an aspect of the present disclosure proposes an electronic payment terminal comprising a light guide having shock-absorbing pads that extend beyond the external surface of the terminal so as to enable the absorption of shocks when necessary. Since such a guide is integrated into the terminal, the solution becomes particularly resistant because such a pad cannot be wrenched off in a fall as could be the case for a simple protective casing.

According to one particular feature of the disclosure, the electronic payment terminal is characterized in that said at least one shock-absorbing pad extends on either side of at least one ridge of said electronic payment terminal.

Thus, according to this aspect of the present disclosure, the shock-absorbing pad is placed on a fragile zone of the terminal, thus optimizing the protective function of the terminal.

According to one particular aspect of the present disclosure, the electronic payment terminal is characterized in that said at least one ridge is situated on the periphery of the rear face of said terminal.

Thus, according to this aspect of the present disclosure, the shock-absorbing pad is placed on the zone most likely to be the first part to touch an obstacle when a fall occurs in operational conditions of use, for example when the merchant is presenting the electronic payment terminal to the purchaser in order to make a transaction.

According to one particular aspect of the disclosure, the electronic payment terminal is characterized in that said shock-absorbing pad is constituted by the same material as the rest of the light guide.

Thus, according to this aspect of the present disclosure, the light guide can be made in a particularly simple and economical way, for example by molding in only one step. For example, the shock-absorbing pads are thus also capable of conducting light.

According to one particular characteristic of the disclosure, the electronic payment terminal is characterized in that said material is silicone.

Thus, according to this aspect of the present disclosure, the light guide is made out of a low-cost material enabling both the guiding of light and the absorption of shocks. For example, the hardness of this material can be easily adapted to ensuring an optimal shock-absorbing function while at the same time preserving its capacity to guide light.

According to one particular aspect of the present disclosure, the electronic payment terminal is characterized in that said material has a hardness value ranging from 55 to 65 Shore A, preferably 60 Shore A.

Thus, according to this aspect of the present disclosure, the hardness of the light guide is optimized for absorbing shocks undergone by an electronic payment terminal when it falls from a height of up to 1.20 m, while preserving the light-guide function.

According to one particular aspect of the present disclosure, the electronic payment terminal comprises a light guide having at least one protrusion flush with the external surface of said electronic payment terminal, said protrusion being disposed so as to be facing at least one light source internal to said terminal, this electronic payment terminal being characterized in that said shock-absorbing pad is also disposed so as to be facing said at least one light source internal to said electronic payment terminal.

Thus, according to this aspect of the present disclosure, the light guide fulfills its function, by means of protrusions, each of these protrusions being used to guide light from a light source internal to the terminal towards the exterior. Besides, since the shock-absorbing pads are made out of the same material as the rest of the light guide, they can also guide light towards the exterior of the terminal when they are disposed so as to be facing the same light sources. Thus, the pads, in addition to fulfilling their shock-absorbing role, can reinforce the light signaling made to the user during the contactless transaction.

According to one particular aspect of the disclosure, the electronic payment terminal is characterized in that it has four of said shock-absorbing pads.

Thus, according to this aspect of the present disclosure, the terminal has as many shock-absorbing pads as there are light indicators required by the above-mentioned standards on contactless electronic payment terminals.

According to one particular characteristic of the disclosure, the electronic payment terminal is characterized in that said contactless payment module is externally mounted on at least one part of at least one side of said electronic payment terminal.

The disclosure also relates to a light guide for electronic payment terminals characterized in that it comprises at least one shock-absorbing pad.

Thus, the disclosure also relates to a light guide having at least one shock-absorbing pad used for the protection of the electronic payment terminal in which the light guide is mounted.

5 LIST OF FIGURES

Other features and advantages shall appear more clearly from the reading of the following description of one particular embodiment of the disclosure, given by way of a simple illustratory and non-exhaustive example, and from the appended drawings, of which:

FIG. 1 corresponds to a front view of an electronic payment terminal according to an aspect of the present disclosure having an externally mounted contactless payment module;

6 DETAILED DESCRIPTION OF ILLUSTRATIVE EMBODIMENTS

According to the general principle of the described technique, the light guide initially dedicated to the display of the light points required by the above-mentioned contactless payment standards, in order to indicate the progress of the transaction, is used to make the payment terminal shock-resistant, for example during falls.

Such a light guide according to an exemplary aspect of the present disclosure then has at least one shock-absorbing pad extending beyond the external surface of the electronic payment terminal once this terminal has been assembled.

Figure 1:
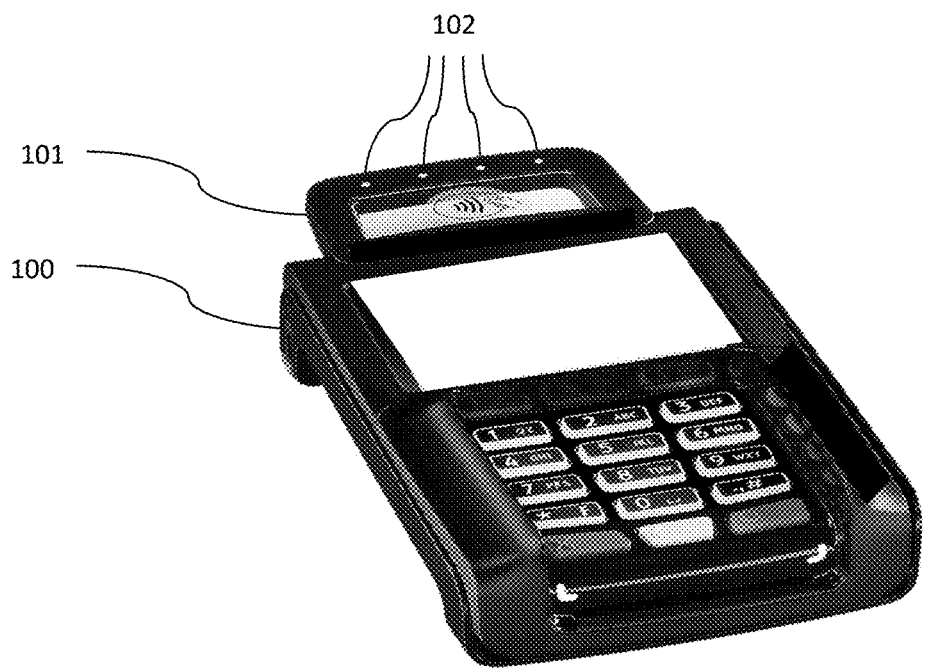

Referring to FIG. 1, a description is now provided of an example of an electronic payment terminal according to an aspect of the present disclosure having an externally mounted contactless payment module.

According to this embodiment, the contactless payment module 101 is externally mounted on the upper part of the electronic payment terminal 100. Thus, neither the lateral right-hand part nor the lateral left-hand part of the terminal is favored. This is the best ergonomic compromise for the user who has to present his contactless payment card, regardless of his laterality. Besides, the lower part of the terminal is dedicated to the aperture used for the insertion of the payment card during a classic "with-contact" payment, thereby avoiding the use of the contactless payment module at this lower part.

The payment module has four light indicators 102 dedicated to displaying the progress of the transaction as required by the above-mentioned standards for contactless payment terminals. Advantageously, these light indicators are formed by protrusions of a light guide whose purpose is to guide the light emitted by light sources (for example light-emitting diodes or LEDs), internal to this terminal, towards the exterior of the terminal.

Figure 2A:
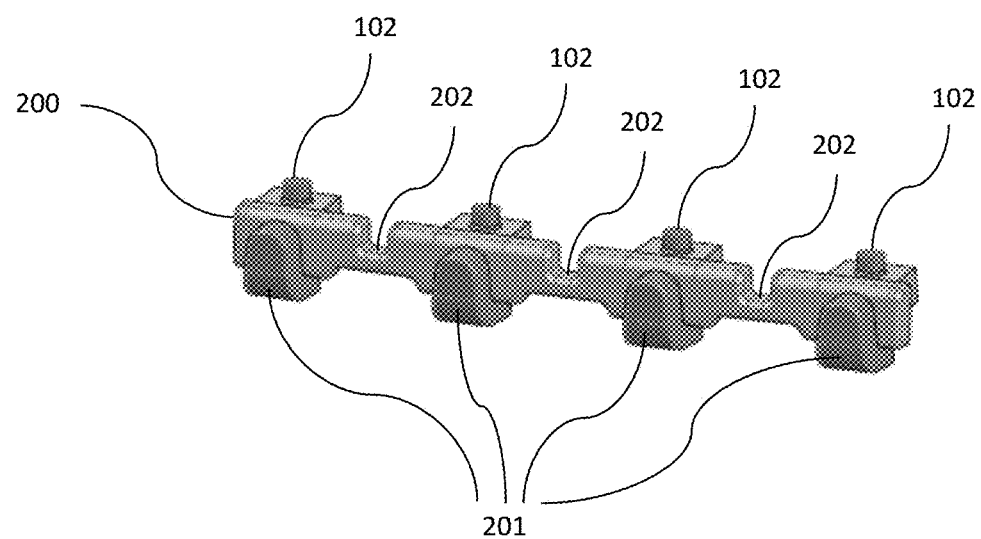
FIGS. 2a and 2b illustrate a light guide for an electronic payment terminal according to one aspect of the present disclosure, respectively seen in a front view and in a rear view.
Figure 2B:
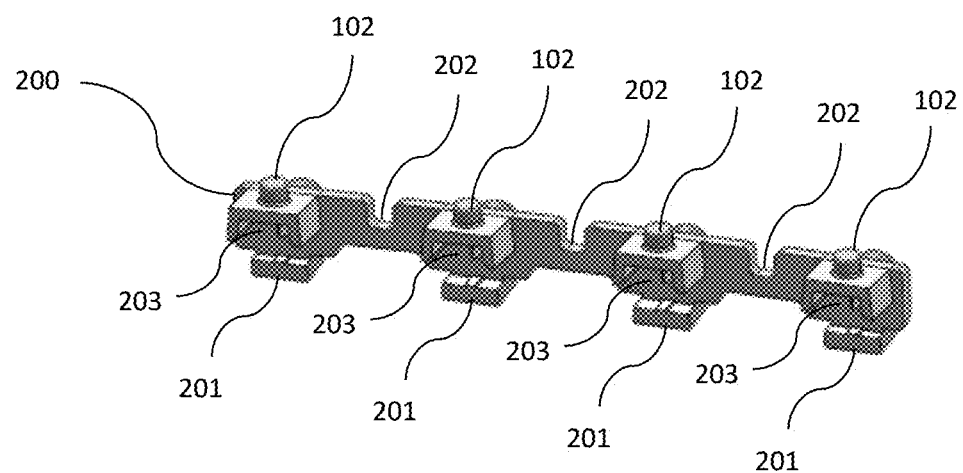

A more detailed description is now given of the structure of such a light guide with reference to FIGS. 2a and 2b, according to one embodiment of the disclosure.

According to this particular embodiment, the light guide 200 has protrusions 102 made out of a material that enables light to be guided. These protrusions are flush with the surface of the electronic payment terminal, facing apertures or transparent zones provided on this surface, once the terminal is assembled. By construction, these protrusions are disposed so as to be facing the positions 203 that will each receive a light source, typically a LED, these light sources being for example integrated with a printed circuit of the electronic payment terminal. Thus, when one of these LEDs is lit, the light sent out by it is guided up to the external surface of the terminal through the protrusion of the light guide, thereby enabling a light indicator to be obtained.

As required by the above-mentioned standards for contactless payment terminals, four of these light indicators should be present on the surface of the terminal. More specifically, these four indicators must be capable of being lit successively in order to illustrate the progress of the transaction. Thus, to be able to arrive at this result, it must be possible to isolate these protrusions 102 of the light guide from one another. Since the light guide according to this embodiment is made out of a single material (typically silicone), the "isolation" between the protrusions is obtained by a narrowing 202 of the part that links these different protrusions 102. Such a protrusion cuts off or at least limits light propagation between protrusions.

The inventors realized at this point that, in addition to its own properties used classically to guide light, this same material surprisingly had elastic properties by which it could absorb shocks. Thus, the light guide according to the embodiment illustrated in FIGS. 2a and 2b further comprise shock-absorbing pads or pads 201 that extend beyond the surface of the electronic payment terminal once this terminal has been assembled. Thus, during a fall for example, the energy released by the shock can be absorbed by such pads extending beyond the surface of the terminal when they are the first to receive the shock. Advantageously, the pads are made of the same material as the rest of the light guide, thus keeping manufacturing costs to a minimum, the part possibly being made in a single molding step. Typically, the material is silicone, the hardness of which can be easily optimized to absorb shocks while preserving its qualities of light conduction. A campaign of trials has shown that a hardness value of 55 to 65 Shore A, preferably 60 Shore A, gives optimal results both for the propagation of light and for the protection of electronic payment terminals according to an exemplary embodiment during falls from a height could go up to 1.20 m. According to a method well known to those skilled in the art, such values of hardness are classically measured by using a Shore hardness durometer equipped with a type A penetrator.

Advantageously, a shock-absorbing pad is disposed so as to be facing each light source, thus leading to the presence of four shock-absorbing pads on the light guide corresponding to the embodiment described. Since these pads are made of the same material as the rest of the light guide, four pads are obtained which respectively light up at the same time as the light indicator disposed so as to be facing the same light source as themselves. In this way, the shock-absorption effect is added up with that of the reinforcement of the light-signaling function.

Figure 2C:
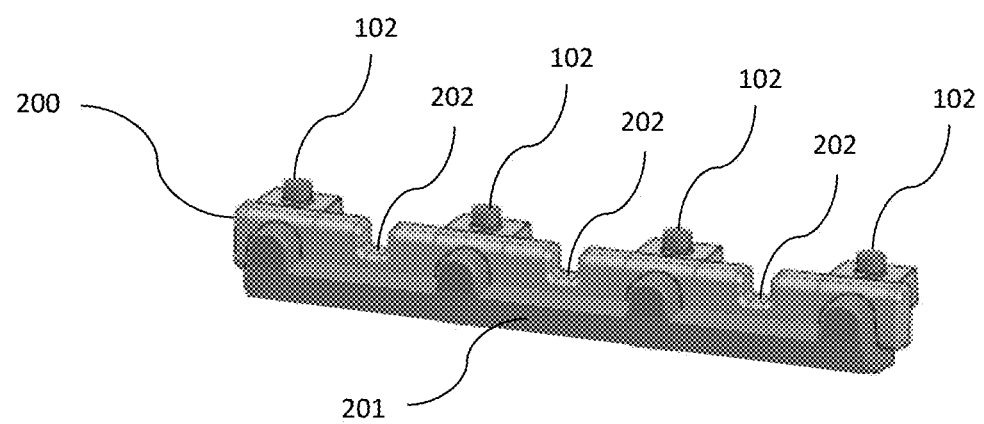
FIG. 2c illustrates a front view of a light guide for an electronic payment terminal according to another aspect of the present disclosure.

According to one alternative embodiment illustrated in FIG. 2c, the light guide can have a single shock-absorbing pad 201 with a length close to the length of the light guide itself. This variant makes it possible to obtain a simpler shape of light guide while offering optimal resistance to shocks owing to its greater surface area used to absorb the shocks. By contrast, such a solution requires a greater quantity of material for the light guide.

Thus, the number and shape of the shock-absorbing pads and their location on the light guide can be variable and chosen so as to optimally meet the problem of resistance to shocks while at the same time not impairing the primary function of the light guide which is that of meeting the requirements of the above-mentioned standards in terms of visual indications of contactless payment for a user.

Figure 3:
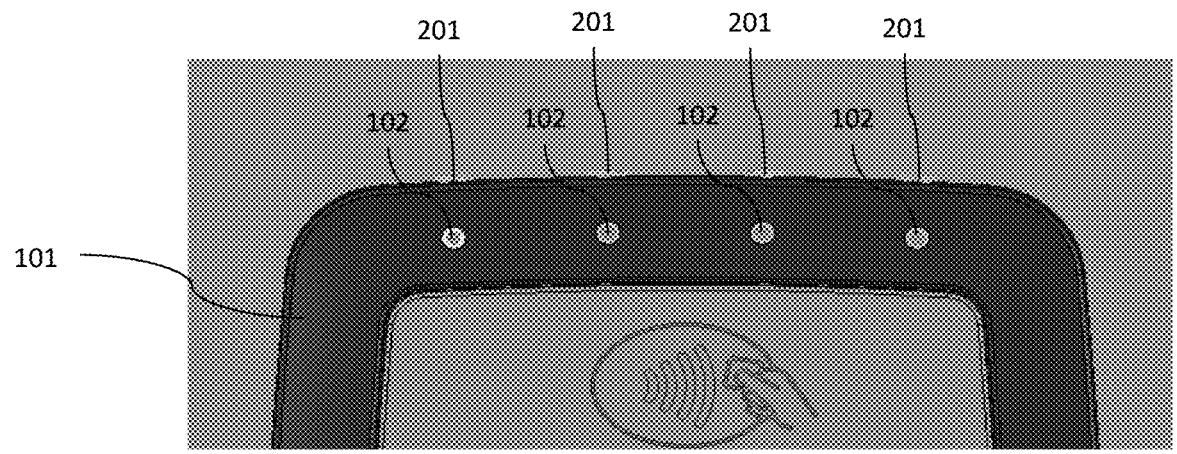
FIG. 3 illustrates a contactless payment module integrated into an electronic payment terminal according to an aspect of the present disclosure.

Referring to FIG. 3, a more detailed description is now provided of the cooperation of a light guide with a contactless payment module with which it is integrated, according to one embodiment of the disclosure.

According to this particular embodiment, the light guide is integrated into a contactless payment module 101 designed to be externally mounted relative to from an electronic payment terminal. The light indicators formed by protrusions 102 of the light guide as well as the shock-absorbing pads 201 are then the only elements of the light guide that are visible from the exterior of the contactless payment module. More specifically, the protrusions are then flush with the front face of the contactless payment module while the pads go beyond this surface to absorb the shocks if necessary. However, since these pads are positioned on the ridge between the rear face and the upper edge of the contactless payment module, they remain discreet to the user who is in a nominal position of use of the terminal, i.e. facing the payment module from the front.

According to this embodiment, a pad is aligned with each light indicator formed by a protrusion of the light guide, this light guide being made out of only one material, each pad being then lit at the same time as the light indicator corresponding to it, which reinforces the light indication that informs the user about the progress of the transaction.

Figure 4:
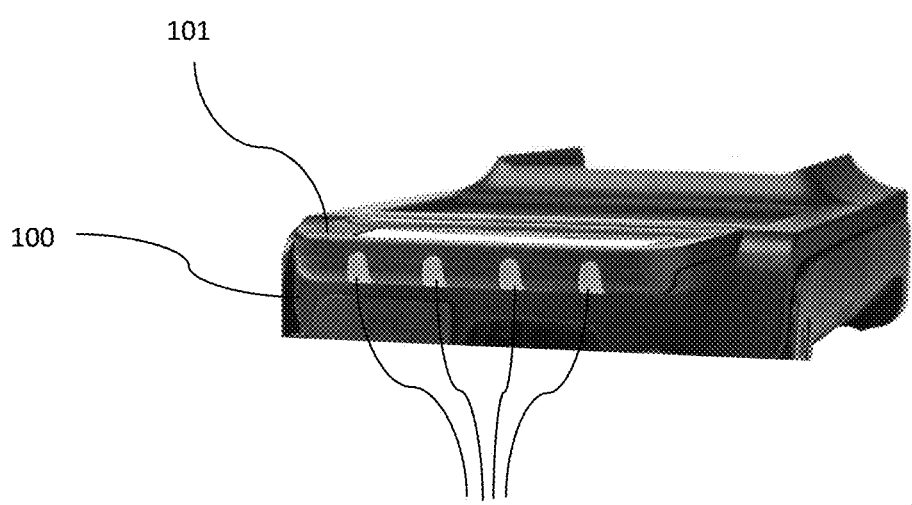
FIG. 4 is a rear view of an electronic payment terminal according to an aspect of the present disclosure.

A more detailed description is now provided of an electronic payment terminal with reference to FIG. 4 according to one embodiment of the disclosure. This figure actually corresponds to a view from the top of the contactless payment module of the electronic payment terminal (seen in a front view in FIG. 1).

Thus, in this embodiment, the shock-absorbing pads extend on either side of one of the ridges of the electronic payment module situated on the periphery of the rear face of this module. Indeed, electronic payment modules get dropped mostly when the merchant is presenting the terminal to the user of the payment card, and this action of presenting is done mainly with the screen oriented towards the user. It is preferable to give priority to protecting the ridges situated on the periphery of the rear face of the payment module which are most likely to hit the ground when the device falls.

Besides, since the light guide is advantageously constituted by only one material and made out of one piece, obtained for example by molding, the proposed solution is then particularly resistant over time. Indeed, a shock-absorbing pad extending beyond the external surface of a payment terminal according to an aspect of the present disclosure cannot get wrenched off in a fall as would be happen with simple shock absorption means fixed to the surface of the payment module or with a protection casing.

Although the present disclosure has been described with reference to one or more examples, workers skilled in the art will recognize that changes may be made in form and detail without departing from the scope of the disclosure and/or the appended claims.

The invention claimed is:

1. An electronic payment terminal comprising:
    a contactless payment module integrated with said electronic payment terminal;
    at least one light source internal to said electronic payment terminal;
    a light guide to guide light from the at least one light source internal to said electronic payment terminal to an exterior of said electronic payment terminal, wherein said light guide is integrated with the contactless payment module and comprises at least one shock-absorbing pad extending beyond the external surface of said electronic payment terminal.

2. The electronic payment terminal according to claim 1 wherein said at least one shock-absorbing pad extends on either side of at least one ridge of said electronic payment terminal.

3. The electronic payment terminal according to claim 2, wherein said at least one ridge is situated on a periphery of a rear face of said terminal.

4. The electronic payment terminal according to claim 1, wherein said shock-absorbing pad is constituted by a same material as the rest of the light guide.

5. The electronic payment terminal according to claim 4 wherein said material is silicone.

6. The electronic payment terminal according to claim 4, wherein said material has a hardness value ranging from 55 to 65 Shore A.

7. The electronic payment terminal according to claim 4, wherein the light guide comprises at least one protrusion flush with an external surface of said electronic payment terminal, said protrusion being disposed so as to be facing the at least one light source internal to said terminal, and wherein said shock-absorbing pad is also disposed so as to be facing said at least one light source internal to said electronic payment terminal.

8. The electronic payment terminal according to claim 4, wherein said material has a hardness value of 60 Shore A.

9. The electronic payment terminal according to claim 1, comprising four of said shock-absorbing pads.

10. The electronic payment terminal according to claim 9, consisting of four of said shock-absorbing pads.

11. Electronic payment terminal according to claim 1, wherein said contactless payment module is externally mounted on at least one part of at least one side of said electronic payment terminal.

* * * * *